United States Patent [19]

Salomon

[11] Patent Number: 5,198,132

[45] Date of Patent: Mar. 30, 1993

US005198132A

[54] ANTIOXIDANT PRODUCTS

[75] Inventor: Mary F. Salomon, Cleveland Heights, Ohio

[73] Assignee: The Lubrizol Corporation, Wickliffe, Ohio

[21] Appl. No.: 595,904

[22] Filed: Oct. 11, 1990

[51] Int. Cl.⁵ ................ C10M 135/22; C10M 135/24
[52] U.S. Cl. .................... 252/48.2; 568/39; 568/50; 252/49.3; 252/49.5
[58] Field of Search ............. 252/48.2, 49.3, 49.5; 568/39, 50

[56] References Cited

U.S. PATENT DOCUMENTS

| | | | |
|---|---|---|---|
| 2,230,966 | 2/1941 | Reid et al. | 252/45 |
| 2,282,710 | 5/1942 | Dietrich | 252/47 |
| 2,531,602 | 11/1950 | Bell | 260/609 |
| 2,532,612 | 12/1950 | Doumani | 260/609 |
| 2,582,605 | 1/1952 | Richter et al. | 260/608 |
| 2,930,815 | 3/1960 | Nedwick et al. | 260/607 |
| 2,943,112 | 6/1960 | Popoff et al. | 260/576 |
| 3,232,936 | 2/1966 | Reynolds | 260/247.1 |
| 3,335,189 | 8/1967 | Degener et al. | 252/48.2 |
| 3,450,771 | 6/1969 | Dombro | 260/609 |
| 3,548,008 | 12/1970 | Wilder | 260/609 |
| 4,031,023 | 6/1977 | Musser et al. | 252/48.2 |
| 4,267,375 | 5/1981 | Maasbol et al. | 568/57 |
| 4,366,307 | 12/1982 | Singh et al. | 528/373 |
| 4,764,299 | 8/1988 | Salomon | 252/48.2 |
| 4,769,164 | 9/1988 | Salomon | 252/48.2 |
| 4,798,684 | 1/1989 | Salomon | 252/47.5 |
| 4,894,174 | 1/1990 | Salomon | 252/48.2 |

OTHER PUBLICATIONS

"Nucleophilic Substitution of Hydroxyl Groups in 2-Alkyl(Aryl)-Thioethanols", Fokin et al., Bull. Cad. Sci. USSR Div. Chem. Sci., 1982, pp. 1667-1672.

"Thioglycol Polymers. I. Hydrochloric Acid-Catalyzed Autocondensation of Thiodiglycol", Woodward, Journal of Polymer Science XLI, pp. 219-223 (1959).

"The Condensation of 2-Hydroxyethyl Sulfide with Alcohols and Phenols", Richter et al., Journal of Polymer Science, vol. 74, pp. 4076-4079.

Primary Examiner—Jerry Johnson
Attorney, Agent, or Firm—Forrest L. Collins; James L. Cordek; Frederick D. Hunter

[57] ABSTRACT

This invention describes various compositions obtained from thiodiglycol or thiodiglycol polymers. The compositions have unique antioxidant capability and are useful in a variety of functional fluids, hydraulic fluids, automatic transmission fluids and generally in oils of lubricating viscosity such as crankcase oils or greases.

12 Claims, No Drawings

ANTIOXIDANT PRODUCTS

INTRODUCTION TO THE INVENTION

1. Field of the Invention

This invention relates to products which contain sulfur and oxygen functionality. The products are useful as antioxidants.

2. Description of the Art

It is known from German OLS 1,066,019, published Sep. 24, 1959 by Holtschmitt et al that various condensation products of thioglycol and nitrogen-containing materials may be prepared. Holtschmitt discloses compounds as having free hydroxyl groups. Holtschmitt also discloses the use of aromatic amines having a short aliphatic group on the aromatic ring such as toluidiene. Dietrich in U.S. Pat. No. 2,282,710 issued May 12, 1942 states that petroleum hydrocarbons may be stabilized by compounds containing both a nitrogen and a sulfur functional group. Various cyclic, aromatic and linear carbon configurations are shown in the sulfur and nitrogen-containing molecules of Dietrich.

It is known from an article entitled *Thioglycol Polymers I Hydrochloric Acid-Catalysed Auto Condensation of Thiodiglycol* by Woodward, Journal of Polymer Science XLI, Pages 219-223 (1959), that the properties of a sulfur and oxygen containing compound allow end-to-end condensation. It is further known from the Woodward article that multiple sulfur linkages within the molecule, e.g. disulfides, trisulfides, and the like may be obtained.

The author of the present invention has also provided additional products containing thiodiglycol units including those disclosed in U.S. Pat. Nos. 4,769,164, 4,764,299 and 4,798,684 issued on Sep. 6, 1988; Aug. 16, 1988; and Jan. 17, 1989 respectively.

The preparation of alkylthioalkanols are described in U.S. Pat. No. 4,031,023 to Musser et al. The Musser et al patent was issued Jun. 21, 1977 and is assigned to The Lubrizol Corporation.

It is further known from an article entitled *The Condensation of 2-Hydroxyethylsulfides with Alcohols and Phenols*, Richter et al, Journal of Polymer Science, Volume XLI, Pages 4076-4079, that a beta-dithioalkanol when reacted in the presence of hydrochloric acid and in alcohol will give the corresponding ether as a reaction product. The technology in the Richter article is further reported in U.S. Pat. No. 2,582,605 issued Jan. 15, 1952.

Aromatic sulfur-containing compounds containing betahydroxy groups and their reaction products are discussed in an article entitled *Nucleophilic Substitution of Hydroxyl Groups in 2-Alkyl (Aryl)-Thioethanols* by Fokin et al, Bull. Cad. Sci. USSR Div. Chem. Sci. 1982, Pages 1667-1672. U.S. Pat. No. 2,943,112 to Popoff et al issued Jun. 28, 1960 states that the preparation of diphenyl amine compounds is possible and such compounds may be used as antioxidants in rubber compositions.

U.S. Pat. No. 3,450,771, to Dombro issued Jun. 17, 1969 describes organic sulfides prepared by reacting mercaptan with an alcohol. Maasbol et al in U.S. Pat. No. 4,267,375, issued May 12, 1981 describes thioethers made by reacting a thiol with an alcohol. German OLS 3,225,709, to Bott describes the preparation of thioethers from alkali mercaptides, alcohols and carbon monoxide.

Dietrich in U.S. Pat. No. 2,282,710, issued May 12, 1942 describes the manufacture of amino-substituted sulfides or thiols. Reynolds in U.S. Pat. No. 3,232,936, issued Feb. 1, 1966 discloses the introduction of a mercaptoethyl radical into amines.

The dehydration of thiodiglycol is described in Doumani in U.S. Pat. No. 2,532,612, issued Dec. 5, 1950. Nedwick et al in U.S. Pat. No. 2,930,815, issued Mar. 29, 1960 discloses reacting a thiol, an alcohol, a catalyst and an acetylene solvent. Bell in U.S. Pat. No. 2,531,602, issued Nov. 28, 1950 discloses reacting unsaturated organic compounds with sulfhydryl and mercaptans. Wilder in U.S. Pat. No. 3,548,008, issued Dec. 15, 1970 discloses sulfur containing compositions obtained from mercaptans.

Reid et al in U.S. Pat. No. 2,230,966, issued Feb. 4, 1941 discloses the preparation thio substituted alkyl thio ethers. Singh et al in U.S. Pat. No. 4,366,307, discloses obtaining a liquid, sulfur and oxygen containing polymer.

The present invention deals with products obtained from polyhydric sulfur-containing compositions such as thiodiglycol with a mercaptan and an alcohol. Preferably the compositions obtained herein have the residues on opposite ends of the thiodiglycol structure.

Throughout the specification and claims, percentages and ratios are by weight, temperatures are in degrees Celsius and pressures are in KPa gauge unless otherwise indicated. Ranges and ratios are exemplary and may be combined. To the extent that the references cited herein are relevant to the present invention, they are herein incorporated in their entirety by reference.

SUMMARY OF THE INVENTION

The present invention describes a composition which is the reaction product of (A) a beta-thiodialkanol, (B) a mercaptan, and an alcohol.

A further variation of the present invention is a composition of the structural formula

$$R^1O[A(S)_xAO]_yAS_xASR^2$$

wherein $R^1$ and $R^2$ are hydrocarbyl groups, A is an alkylene group, x is at least one and y is zero or greater.

A still further embodiment of the present invention is a method of inhibiting oxidation by employing in a composition containing a material subject to oxidation, an effective amount of a composition which is the reaction product of (A) a beta-thiodialkanol, (B) a mercaptan, and (C) an alcohol.

DETAILED DESCRIPTION OF THE INVENTION THE THIODIALKANOL

The first component to be discussed herein is (A) the beta-thiodialkanol. The beta-thiodialkanol is simply described by the formula

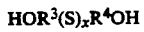

$$HOR^3(S)_xR^4OH$$

Substituents on $R^3$ and $R^4$ are possible provided that two carbon atoms intervene between the sulfur and the oxygen. Of course the substituents should not interfere with the reactivity of the beta-thiodialkanol as described herein. Moreover, the substituents if any should not interfere with the end use of the described compositions as an antioxidant.

Following from the above description, $R^3$ and $R^4$ are each $-CHR^5CHR^6-$. Where both $R^5$ and $R^6$ are hydrogen, an ethylene group exists between the hydroxyl and the sulfur atom. As previously noted $R^5$ and $R^6$ may be any non-interfering hydrocarbyl group. A hydrocarbyl group as defined herein with regard to this component and to others is a moiety containing hydrogen and carbon and any other non-interfering atoms. The non-interference goes to the reactivity of the component or its desired utility. Preferably, $R^5$ or $R^6$ are hydrogen or a lower straight chain alkyl group such as methyl or ethyl, e.g. giving a propylene or butylene segment. It is noted that if $R^5$ or $R^6$ contains a t-butyl group, that the condensation reaction to form the claimed compositions will be hindered. However, a styrene residue is non-interfering with the reactivity and may be utilized as $R^3$ or $R^4$.

The beta-thiodialkanol preferably contains only one sulfur atom per repeating unit, i.e., x is 1. However, it is acceptable and under some conditions desirable to have x at a value of 2 thereby having a disulfide structure in the molecule. It is also possible to have compositions where there are mixtures of monosulfide and disulfide present. In an automatic transmission fluid, the monosulfide is desired. In lubricating oils for engines (e.g. crankcase oils), some disulfide is desired to provide anti-wear as well as antioxidant properties.

The presence of repeating thiodiglycol units within the molecule is shown in the structural formulas given above by the value of y. For instance, when there is no self-condensation of thiodiethanol the value of y is 0. Preferably the value of y for a polymer is 1 to about 5, and most preferably 1 to about 3. The polymerization is accomplished by using at least an equivalent excess of the thiodialkanol. The polymerization of the thiodialkanol may be done independently of its introduction to the remaining reactants, e.g. the alcohol, or the mercaptan. Alternatively, the polymerization of the thiodialkanol may be done in situ, e.g., a one-pot reaction where the thiodialkanol is polymerized in the presence of the remaining reactants. It should be noted that the competing reactions in an in situ situation will lead to a mixture of products as the polymerization competes with the other reactions. If it is desired to obtain the product where y is 0 it is suggested that the remaining reactants be introduced to the reaction vessel, followed by slowly introducing the thiodialkanol.

It should also be noted that one mole of the thiodialkanol is a difunctional hydroxyl compound and that if y is 0, then it will react with two equivalents of a monomercaptan or two equivalents of a monohydric alcohol (or n equivalents of a monomercaptan and 2-n equivalents of a monohydric alcohol) where 0L2Ln to liberate two moles of water.

THE ALCOHOL

The alcohol, $R^1OH$, is typically a monofunctional alcohol (e.g. one hydroxyl equivalent) wherein $R^1$ is a hydrocarbyl group. The alcohol may also be a polyol $R^1(OH)_a$ where a is 1 or greater; preferably 2. While R is stated to hydrocarbyl, it is desirable that the hydrocarbyl group in this instance be limited to materials which do not react with the hydroxyl groups of the thiodialkanol. If the group $R^1$ contains moieties which react with the thiodialkanol then cross-linking of the product is possible and such is not desired. The alcohol is preferably a primary alcohol with a further preference for branched alcohols. A particularly desirable group of materials as the alcohol are the neo alcohols. In particular, a preferred alcohol is 2,2,4-trimethylpentanol. A second preferred alcohol is isobutyl alcohol. The alcohols may also contain hetero atoms in the hydrocarbyl group which are non-interfering, such as esters, ethers, sulfides and tertiary amine structures.

Conveniently $R^1$ is an aliphatic group containing about 2 to about 30 carbon atoms, preferably 4 to about 20 carbon atoms and most preferably about 6 to about 18 carbon atoms.

A particular advantage of the compositions of the present invention is that they have excellent fluidity and low temperature blend viscosity properties throughout the useful life of the product. That is, the compositions of the present invention are easily blended into, for example, an automatic transmission fluid and further do not separate from the base fluid under low temperature conditions. The particular choice of the alcohol aids in these properties. In addition to the alcohols described above materials which may be utilized herein as the alcohol include ethanol, propanol, isopropanol, n-butanol, 2-methyl propanol, the pentanols, the hexanols, the heptanols, the octanols, the nonanols, the decanols, and the like.

THE MERCAPTAN

The next aspect to be discussed in the present invention is the mercaptan. Mercaptans are a group of organo sulfur compounds that are derivatives of hydrogen sulfide in the same way that alcohols are derivatives of water. Mercaptans are referred to generally as thiols. Mercaptans have a —SH group in the molecule. In the present invention it is first preferred that the mercaptan be a single thiol or —SH group e.g. one equivalent. The mercaptans are preferably aliphatic and have the formula $R^2(SH)_z$ wherein the value of z is typically 1 to prevent further polymerization other than that from the thiodiglycols. Mercaptans are highly reactive in the presence of thiodiglycol and condense with the hydroxyl group from the thiodiglycol to give water. As the present invention desires that the mercaptan residue be on one end of a thiodiglycol molecule the amount of reactants should be controlled to minimize obtaining a material containing more than one mercaptan residue. The mercaptan $R(SH)_x$ or $R^2SH$ has the value of R as a hydrocarbyl group. Typically the hydrocarbyl group will be an aliphatic or aromatic material which gives the product an oil-dispersible or oil-soluble character.

Where the mercaptan is an aliphatic material it will typically contain about 4 to about 20 carbon atoms. Examples of mercaptans include material such as methyl mercaptan, ethyl mercaptan, propyl mercaptan, n-butyl mercaptan, n-pentyl mercaptan, and various isomers of these compounds. Further mercaptans include octyl mercaptan, decyl mercaptan, or dodecyl mercaptan, or octadecyl mercaptan. An example of an armoatic mercaptan is thiophenol. Further useful mercaptans herein include heterocycles containing pendant (SH) groups such as mercaptothiadiazoles or mercaptobenzothiazole. It is desirable herein that the mercaptan be substantially free of hydroxyl groups such that the eventual reaction product is also substantially free of a hydroxyl group. This point also follows from the use of the later described alcohols herein that the eventual end product should not contain free hydroxyl or sulfhydryl groups.

PROCESSING CONDITIONS

As previously described if it is desired that polymeric units of the thiodialkanol be obtained for use herein the reader is referred back to the section discussing such materials.

The present invention requires that a mercaptan and an alcohol be utilized to react with the thiodiglycol component. The alcohol and the mercaptan are not particularly reactive with one another and thus under moderate conditions these materials may be precombined in a reaction vessel. It is preferred that thiodiglycol or polymeric thiodiglycol be introduced to the mixture of the remaining two components. It is not required, but if desired the reaction may take place in the base fluid e.g. oil of lubricating viscosity, e.g. a likely intended end use fluid.

The reaction is typically conducted in presence of a catalytic amount of an acid such as sulfuric, phosphoric or para-toluene sulfonic acid. The catalyst level is typically at 0.5 to 3% by weight of the thiodialkanol. The reaction temperatures are conveniently maintained between about 30° C. and 300° C., preferably about 50° C. to 250° C. Conveniently, an inert solvent such as toluene is utilized under refluxing conditions such in the condensation reaction. The use of the toluene allows for rapid removal of the water of reaction.

Typically, the reaction is conveniently conducted until no more water it formed. Water may be present as a contaminant in the reactants and is evolved from both the polymerization of the thiodiglycol and the reaction of the alcohol and mercaptan with the thiodiglycol components.

Typically, the time required to complete the reaction will be abut 2 to about 10 hours. Following completion of the reaction the catalyst may be removed by neutralization with caustic or other suitable base. The solvent as previously discussed may than be removed under reduced pressure and the product filtered.

The products of the present invention as previously stated are desirably utilized in various lubricating compositions. The materials may also be used in hydraulic compositions, functional fluids and the like. The use of the compositions of the present invention in automatic transmission fluids is also recommended. The compositions described herein are excellent extreme pressure agents. The compositions, when employed in a motor vehicle oil, are conveniently used in a minor amount with a major amount of an oil of lubricating viscosity.

The base fluid for an aqueous based composition is simply water and such other components as are necessary for the desired functional aspects of the fluid. Where the desired end product is a lubricating oil or a transmission fluid, the base oil is typically hydrocarbon oils useful in conjunction with the compositions of the present invention.

Unrefined, refined and rerefined oils (and mixtures of each with each other) of the type disclosed hereinabove can be used in the lubricants and functional fluids of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The synthetic lubricating oils useful herein include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 100, diphenyl either of polyethylene glycol having a molecular weight of about 500–1000, diethyl ether of polypropylene glycol having a molecular weight of about 1000–1500, etc. or mono-and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl, azelate, diisodecyl azelate, dioctyl phthalate, didecyl phathalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy- or polyaryloxy-siloxane oils and silicate oils comprise another useful class of synthetic lubricants (e.g., tetraethyl silicate, tetraisopropyl silicate tetra-(2-ethylhexyl) silicate, tetra-(4-methyl-hexyl) silicate, tetra(p-tert-butylphenyl)silicate, hexyl-4-methyl-2-pentoxy)disiloxane, poly(methyl)siloxanes, poly(methylphenyl)siloxanes, etc.). Other synthetic lubricating oils include liquid esters of phosphorus containing acids (e.g., tricresyl phosphate, trioctyl phosphate, diethyl ester of decane phosphonic acid, etc.), polymeric tetrahydrofurans and the like.

Polyolefin oligomers are typically formed by the polymerization reaction of alpha-olefins. Non-alpha olefins may be oligomerized to give a synthetic oil within the present invention, however, the reactivity and availability of alpha-olefins at low cost dictates their selection as the source of the oligomer.

The polyolefin oligomer synthetic lubricating oils of interest in the present invention include hydrocarbon oils and halo-substituted hydrocarbon oils such as are obtained as the polymerized and interpolymerized olefins, e.g., oligomers, include the polybutylenes, polypropylenes, propyleneisobutylene copolymers, chlorinated polybutylenes, poly(1-hexenes), poly(1-octenes), poly(1-decenes), similar materials and mixtures thereof.

Typically, the oligomer is obtained from a monomer containing from abut 6 to 18 carbon atoms. Most preferably, the monomer used to form the oligomer is decene, and preferably 1-decene. The nomenclature alpha-olefin is a trivial name and the IUPAC nomenclature of a 1-ene compound may be considered to have the same meaning within the present invention.

While it is not essential that the oligomer be formed from an alpha-olefin, such is desirable. The reason for forming the oligomer from an alpha-olefin is that branching will naturally occur at the points where the olefin monomers are joined together, and any additional branching within the backbone of the olefin can provide too high a viscosity of the end oil. It is also desirable that the polymer formed from the alpha olefin be hydrogenated. The hydrogenation is conducted according to known practices. By hydrogenating the polymer, free radical attack on the allyic carbons remaining after polymerization is minimized.

The molecular weight of the oligomer typically averages from about 250 to about 1400, conveniently from about 280 to about 1200, preferably from about 300 to about 1100, and most preferably about 340 to 520. The choice of molecular weight of the oligomer is largely dependent upon whether a viscosity improver is included within the formulation. That is, the polyolefin oligomer, may require either a thickening or a thinning effect to ensure that the proper lubricating viscosities are maintained under extreme heat and cold conditions.

A further desirable synthetic lubricant is an alkylated aromatic compound. The alkylated aromatic compounds are particularly beneficial in improving the low temperature flow characteristics. A particularly useful synthetic lubricant is a mixture of the alpha olefin oligomer and the alkylated aromatic. Typically, a mixture of the oligomer to the alkylated aromatic will be at a weight ratio of about 8:1 to about 1:8.

Materials which may also be included herein are the natural oils. Natural oils include animal oils and vegetable oils (e.g., castor oil, lard oil) as well as the previously described oils.

Additional materials which are desirably added to the hydrocarbon based fluids are as follows: Viscosity improving materials may be included in the compositions of the present invention. The viscosity index improvers typically include polymerized and copolymerized alkyl methacrylates and mixed esters of styrene-maleic anhydride interpolymers reacted with nitrogen-containing compounds. Also useful are detergents, preferably overbased, especially sodium, calcium, or magnesium detergents. Ashless dispersants such as succinimides may also be included herein.

Polyisobutylene compounds are also typically used as viscosity index improvers. The amount of viscosity improver which may be typically added to the fully formulated transmission fluid composition is about 1% to about 50%, preferably about 10% to about 25% by weight.

Zinc salts are also added to lubricants. The zinc salts are ordinarily utilized as extreme pressure agents, such as zinc dithiophosphates. The zinc salts are added at levels measured by weight of the zinc metal at from about 0.02% to about 0.2%, preferably from about 0.04% to about 0.15% by weight.

Additional ingredients which may be included in lubricants are fatty acid amides which are useful as additional friction modifiers, particularly for reducing the static coefficient of friction. Further useful components herein include seal swell agents such as sulfones and sulfolanes. Suitable seal swell agents are disclosed in U.S. Pat. No. 4,029,587 to Koch issued Jun. 14, 1977. A still further useful component in the present invention is a foam suppression agent such as a silicone oil. Any other typical ingredient may be included herein such as pour point depressants, dyes, odorants and the like.

Additional components which are typically used in transmission fluids, motor oils or hydraulic fluids include the following.

Extreme pressure agents and corrosion and oxidation-inhibiting agents which may be included in the compositions of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctyl-phosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned extreme pressure agents and corrosion-oxidation inhibitors also serve as anti-wear agents. Zinc dialkylphosphorodithioates are a well known example.

Anti-wear agents that are particularly useful in the compositions of the invention are those obtained from a phosphorus acid of the formula (R'O)2PSSH, wherein each R' is independently a hydrocarbon-based group, or the phosphorus acid precursors thereof with at least one phosphite of the formula (R"O)3P, R" is a hydrocarbon-based group, under reaction conditions at a temperature of about 50° C. to about 200° C. R' is preferably an alkyl group of about 3 to about 50 carbon atoms, and R" is preferably aromatic. The salt is preferably a zinc salt, but can be a mixed salt of at least one of said phosphorus acids and at least one carboxylic acid. These anti-wear agents are described more fully in U.S. Pat. No.

4,263,150, which is incorporated herein by reference. These anti-wear agents as well as the anti-wear agents referred to above can be provided in the compositions of the invention at levels of about 0.1% to about 5%, preferably about 0.25% to about 1% by weight based on the total weight of said fluid compositions.

Additional oxidation inhibitors that are particularly useful in the fluid compositions of the invention are the hindered phenols (e.g., 2, 6-di-(t-butyl)phenol); aromatic amines (e.g., alkylated diphenyl amines); alkyl polysulfides; selenides; borates (e.g., epoxide/boric acid reaction products); phosphorodithioic acids, esters and/or salts; and the dithiocarbamates (e.g., zinc dithiocarbamates). These oxidation inhibitors as well as the oxidation inhibitors discussed above are preferably present in the fluids of the invention at levels of about 0.025% to about 5%, more preferably about 0.1% to about 2% by weight based on the total weight of such compositions.

The rust-inhibitors that are particularly useful in the compositions of the invention are the alkenyl succinic acids, anhydrides and esters, preferably the tetrapropenyl succinic acids, acid/esters and mixtures thereof: metal (preferably calcium and barium) sulfonates; the amine phosphates; and the imidazolines. These rust-inhibitors are preferably present at levels of about 0.01% to about 5%, preferably about 0.02% to about 1% by weight based on the total weight of the product.

Pour point depressants may be included in the compositions described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. Publishers, Cleveland, Ohio 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumerates, vinyl esters of fatty acids and alkyl vinyl ethers. Pour point depressants useful for the purposes of this invention, techniques for their preparation, and their uses are described in U.S. Pat. Nos. 2,387,501; 2,015,748; 2,655,479; 1,815,022; 2,191,498; 2,666,746; 2,721,877; 2,721,878 and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Kerner (Noyes Data Corporation, 1976), pages 125–162.

UTILIZATION OF THE COMPOSITION

The composition of the present invention is typically used in the automatic transmission fluid, hydraulic fluid, functional fluid or lubricating oil composition at a level of about 0.025% to about 5%, preferably from about 0.1% to about 2% by weight. As the products of the invention are oleophilic, the blending of the products is relatively simple. Where the compositions of the present invention are intended for use in an aqueous based material, it is desirable to include such adjuvants and other materials as may be necessary to stably disperse the active ingredients in the aqueous formulation. When an aqueous composition is utilized, it is typically up to 85% and preferably up to 90% water, with the remainder being the active ingredient of this invention and other materials typically placed in such aqueous formulations.

A particular advantage of the compositions of the present invention is that they have excellent peroxide decomposing properties. The compositions of the present invention are easily blended into an automatic transmission fluid or motor oil. The following are examples of the present invention.

EXAMPLE A

A product is made according to the present invention from a monohydric alcohol, a mercaptan and thiodiethanol. The alcohol chosen for this example is n-amyl alcohol and the mercaptan is n-dodecyl mercaptan.

The reaction is conducted in a suitable glass lined vessel utilizing sulfuric acid as a catalyst. The reactants are used at one mole each. The amyl alcohol and the mercaptan are added to the reaction vessel in the presence of 200 ml of toluene solvent. The reaction is catalyzed with 3 gm of sulfuric acid.

The reactants in the reaction vessel are heated to reflux and the addition of thiodiethanol is begun. The thiodiethanol is added drop wise over a period of approximately two hours. The progress of the reaction is measured by the evolution of water collected from the azeotropic distillation. The heating is continued at reflux for a period of an additional four hours past the last observed water evolution to ensure completeness of the reaction.

The reaction mixture is cooled to below 100° C. and caustic soda liquid is added to neutralize the catalyst. The solvent and water of neutralization are then removed by reduced pressure distillation.

The product is then allowed to cool and is filtered through DD-1600 filter aid (diatomaceous earth). The filtrate is the desired product and is recovered in an 96% yield.

EXAMPLE I

An automatic transmission fluid is obtained which does not contain a conventional antioxidant. An automatic transmission fluid is prepared utilizing one part of the antioxidant of Example A per 100 parts of the automatic transmission fluid. The automatic transmission fluids obtained herein perform favorably when compared to conventional antioxidants as utilized in an automatic transmission fluid.

EXAMPLE II

A motor vehicle lubricating oil is prepared by combining the following components:
100 parts of 100N mineral oil
2 parts of a calcium overbased alkylbenzene sulfonic acid detergent
2 parts of a magnesium phenate detergent
2.5 parts of a neutral sulfur-coupled phenate
6 parts of a polyisobutylene succinimide dispersant
1 part of a secondary zinc dithiophosphate To the above base oil formulation is added 1 part of the antioxidant prepared by Example A. The product is observed to perform as an antioxidant in a motor vehicle crankcase oil. The disulfide of Example A is obtained. This disulfide is utilized at the same weight level in the above example to obtain an anti-wear benefit in addition to the antioxidant benefit.

What is claimed:
1. A composition which is the reaction product of (A) a beta-thiodialkanol, (B) a mercaptan, and (C) a polyol alcohol wherein the polyol is of the formula $R^1(OH)_a$ where a is greater than 1 and $R^1$ is aliphatic.

2. The composition of claim 1 wherein the beta-thiodialkanol is a monosulfide.

3. The composition of claim 1 wherein the reaction product is formed from a greater number of equivalents of the beta-thiodialkanol than the combined equivalents of the mercaptan and the alcohol.

4. The composition of claim 1 wherein the beta-thiodialkanol is thiodiglycol.

5. The composition of claim 1 wherein the mercaptan contains a single —SH group.

6. The composition of claim 1 wherein the beta-thiodialkanol is a disulfide.

7. The composition of claim wherein the alcohol contains from 2 to 20 carbon atoms.

8. The composition of claim 1 wherein the mercaptan contains about 4 to about 20 carbon atoms.

9. The composition of claim 1 wherein the alcohol is a saturated alcohol.

10. The composition of claim 1 wherein the alcohol is a branched alcohol.

11. A composition comprising a major amount of an oil of lubricating viscosity and/or water, or a grease and a minor amount of the composition of claim 1.

12. The composition of claim 3 wherein the ratio of equivalents of the beta-thiodialkanol (A) to the combined equivalents of the mercaptan (B) plus the equivalents of the alcohol (C) is less than 5:1.

* * * * *